United States Patent Office 2,758,040
Patented Aug. 7, 1956

2,758,040

PROCESS FOR PRODUCING COLORLESS STERILE INVERT SUGAR SOLUTION

Lawrence J. Heidt, Arlington, Mass., assignor, by mesne assignments, to Sugar Research Foundation, Inc., New York, N. Y., a corporation of New York No Drawing. Application July 31, 1951, Serial No. 239,635

9 Claims. (Cl. 127—41)

This application is a continuation-in-part of the copending application, Serial No. 114,455, filed September 7, 1949, which was a continuation-in-part of the application, Serial No. 758,995, filed July 3, 1947.

This invention relates to invert sugar and more particularly to sterile stable solutions of invert sugar and their preparation by the inversion of sucrose.

An object of this invention is to produce invert sugar which contains a minimum quantity of the decomposition product of levulose.

Another object of this invention is to provide a sterile water white solution of invert sugar which is substantially free from 5-hydroxymethylfurfural.

Another object of this invention is to sterilize by heat, solutions of invert sugar which are suitable for parenteral administration without the production of detectable quantities of 5-hydroxymethylfurfural as determined by standard color tests.

Sterile solutions of invert sugar have been heretofore proposed as alternatives for solutions of glucose employed therapeutically for parenteral administration. However, such solutions of invert sugar contain contaminants, as evidenced by a yellow or brownish cast of the solution. Such solutions are relatively unstable, producing decomposition products over a period of time which further contaminate the solution of invert sugar.

During sterilization by heat, solutions of invert sugar are especially prone to further decomposition. Since untoward reactions sometimes result from the presence of these contaminants, particularly if a marked quantity is present, many such solutions are not utilized therapeutically.

In accordance with this invention, invert sugar is produced which is substantially free of undesirable decomposition products. More particularly, sterile solutions of invert sugar are produced which are water white in visible light to the naked eye when viewed through a depth of 4 inches and are stable over prolonged periods, such as at least one year at room temperature. Solutions produced in accordance with this invention contain an amount by weight of 5-hydroxymethylfurfural not more than 0.2%, and preferably not more than 0.1%, of the hexose in the solution. Even when such solutions contain this small amount of 5-hydroxymethylfurfural, the amount of sucrose in such solutions is less than 2% of the total sugars present.

The development of color by sugar and its solutions is usually referred to as browning. Along with this color there is always present 5-hydroxymethylfurfural commonly called hydroxymethylfurfural. 5 - hydroxymethylfurfural has also been found to be present when browning is absent, but the amount that can be present without browning is of the order of 0.2% or less by weight of the total sugar. 5-hydroxymethylfurfural is itself colorless, but its concentration and the intensity of browning are roughly directly proportional to each other at a given concentration of hexose. The factor of proportionality, however, varies with the pH of the material and to a smaller extent with the way in which the color has been produced. In particular, I have found that the ratio of the concentration of 5-hydroxymethylfurfural to browning is larger at pH 3 than at pH 4 and continues to decrease as the pH increases.

In invert sugar solution, browning is produced mainly by the decomposition of levulose since its production by dextrose is very much slower.

The production of colorless solutions of invert sugar by the substantially complete inversion of sucrose by acid I have found involves the precise control of the certain specific variables. These variables are the pH of the solution, the temperature at which the inversion is carried out, the initial concentration of sucrose, and the amount of levulose oxidized by such substances as the oxygen present in the solution.

The sterile water white solutions of this invention are produced by initially hydrolyzing aqueous solutions of sucrose under controlled conditions to convert 98 to 99.9% of the sucrose to invert sugar and simultaneously or thereafter sterilizing by heat the hydrolyzed solution also under controlled conditions. The inversion of the sucrose is effected by hydrolyzing 98 to 99.9% of the sucrose in an aqueuos solution having a pH of 0.0 to 4.0 in the substantial absence of an oxidizing agent and at a temperature within the range of 0° to 125° C. The concentration of the sucrose prior to hydrolysis should be not more than 30% when the hydrolysis is effected at a pH above 3 and not more than 10% when the hydrolysis is effected at a pH above 3.5. When it is necessary to effect sterilization after hydrolysis, the hydrolyzed solution is sterilized by heat under such conditions that the resulting sterilized solution has a pH within the range of 2.5 to 4.9.

The steps of hydrolyzing and sterilization may be conducted in sequence or simultaneously. Consequently, both in this description and in the claims, this invention includes within its scope the practice of both steps whether conducted in sequence or simultaneously.

The inversion and sterilization are effected in the substantial absence of an oxidizing agent in the solution. By oxidizing agent is meant any substance at a concentration which will oxidize sugar in an aqueous solution. For example, nitric acid would be such a substance if present at a concentration of greater than 0.1 N. Oxygen in water in equilibrium with the atmosphere is also such an oxidizing agent when the pH of the water is above about 2.3, but is not such an oxidizing agent up to at least a pH of 4.9 when the major portion of the oxygen is removed. Throughout the description and claims, the removal of the major portion of oxygen from the solution means the removal of at least 50% of the oxygen soluble in the solution at room temperature under atmospheric conditions.

If the hydrolysis is conducted within the range of 2.3 to 4.0, the major portion of the oxygen should be removed therefrom by any suitable means, such as physical evacuation of the oxygen by reducing the pressure. One convenient method of removal of the major portion of the oxygen is to adjust the solution to a pH of 2.0 or lower with a non-oxidizing acid, such as hydrochloric acid, followed by addition of a non-toxic salt of carbonic acid, such as sodium bicarbonate or calcium carbonate until the pH of the solution is within the range of 2.3 and 3.0 whereby the oxygen in the solution is replaced by carbon dioxide. Another convenient method of removing the major portion of the oxygen is to add a sufficient amount of a non-toxic salt of carbonic acid to an acid solution until the pH of the solution is between 2.3 and 4.0.

The hydrolysis is effected in an acid solution produced by a non-oxidizing acid, such as mineral acids, for example, hydrochloric acid or sulfuric acid; organic acids, for example, acetic acid, lactic acid or tartaric acid; or acidic resins, for example, cation exchange resins; or any combination of such acids. It is essential that, when the sterile water white solutions of this invention are intended for parenteral use, the acid or any reaction product thereof remaining in the solutions after hydrolysis and sterilization be non-toxic. When an insoluble acid, such as a cation exchange resin, is employed for effecting hydrolysis, it is removed prior to sterilization and a soluble, non-oxidizing acid is employed for obtaining the required pH for the sterilization step.

When the pH of the hydrolyzed solution of invert sugar is such that the solution after sterilization by heat is not within the range of 2.5 to 4.9, it is adjusted to the required pH to produce such a solution. This adjustment is preferably made by the addition of a non-toxic salt of carbonic acid to the solution of invert sugar when the pH is too low, or by the addition of a soluble non-oxidizing acid followed by the addition of a sufficient amount of a non-toxic salt of carbonic acid to the solution of invert sugar when the pH is too high, as, for example, when the hydrolyzed solution results from the use of an anion exchanger.

The hydrolyzed solution having a pH such that when sterilized it will have a pH within the range of 2.5 and 4.9 is sterilized by heat by any convenient means, such as by autoclaving. The sterilized solution is then cooled to room temperature and can be maintained in a water white condition for a period of at least a year.

The methods of this invention are especially suited to the preparation of sterile solutions of invert sugar for parenteral use. Solutions produced by these methods differ from sterile solutions of invert sugar heretofore produced in that the sterile solutions of this invention are colorless and contain an amount by weight of 5-hydroxymethylfurfural not more than 0.2%, and preferably not more than 0.1%, of the hexose in the solution. Moreover, the sterile, colorless solutions of this invention at a pH of 4.0 or greater do not produce untoward reactions when administered parenterally.

The presence of the carbon dioxide in the sterile solution resulting from the neutralization with a non-toxic salt of carbonic acid effects a marked prolongation of the stability of the solution of invert sugar. The carbon dioxide generated in the neutralization step replaces the oxygen contained therein, and the absence of the major portion of oxygen in the solution lessens to a marked degree the tendency of the invert sugar to decompose.

The inversion of between 98 and 99.9% of the sucrose can be controlled adequately without the production of color if the conditions chosen for the inversion are such as to require at least fifteen minutes to invert 99% of the sucrose. This percent of the sucrose can be inverted in fifteen minutes, at a pH of 0.1 at 50° C. or at a pH of 2.3 at 100° C. These pH values are for a 2% sucrose solution; they would be higher at higher initial concentrations of sucrose or at higher temperatures.

If the solutions of invert sugar are required for parenteral use, non-pyrogenic material should be employed, the solutions should be filtered before the sucrose is inverted, and the invert sugar solutions should be sterilized. If non-pyrogenic materials are used, a non-pyrogenic sterile solution of invert sugar results. For therapeutic use, certain acids, such as hydrochloric acid, and certain alkali metal bicarbonates, such as sodium bicarbonate, are more advantageously used for the inversion and neutralization respectively. Solutions of invert sugar of this invention, particularly the saturated solutions of invert sugar, may be employed for other uses, such as ingredients of beverages, candies and ice creams, and for these other uses, a water soluble non-oxidizing acid other than hydrochloric acid which produces a solution having a pH within the range of 0.0 to 4.0, such as sulfuric acid, phosphoric acid, tartaric acid, citric acid, fumaric acid, maleic acid, malic acid and malonic acid may be employed. Some of these non-oxidizing acids may be objectionable for certain uses. Hydrochloric acid is particularly adapted for certain uses, such as for sterile invert sugar solution for parenteral administration.

When a sterile water white invert sugar solution having a final pH of 2.5 to 4.0 is desired, the inversion of up to 99.9% of the sucrose and the sterilization by heat may also be carried out simultaneously by autoclaving at fifteen pounds' steam pressure for twenty to thirty minutes or at seven pounds' steam pressure for thirty to sixty minutes.

The pH of all solutions is determined at room temperature by means of a properly calibrated pH meter employing a glass electrode.

All percentages of the components of the solutions equal 100 times the grams of the component per 100 ml. of the solution at room temperature.

The amount of 5-hydroxymethylfurfural in sugar solutions produced by the inversion of sucrose may be determined by means of a polarograph utilizing the information disclosed, and the references cited, in the paper by S. N. Cantor and Q. P. Peniston in the Journal of American Chemical Society, 62 2113 (1940). I have found that the presence of invert sugar and sucrose does not interfere with the determinaiton of the concentration of 5-hydroxymethylfurfural by means of a polarograph.

Cantor et al. found that the concentration of 5-hydroxymethylfurfural in water solution was directly proportional to the diffusion current (wave height) produced by it. The proportionality factor was found to be independent of the pH of the solution as long as the concentration of 5-hydroxymethylfurfural did not exceed $1 \times 10^{-3}$ molar as disclosed by Figure 4 of their article. In solutions containing a higher concentration of 5-hydroxymethlyfurfural, the concentration of this substance can be reduced to $1 \times 10^{-3}$ molar or less by appropriate dilution. The amount of 5-hydroxymethylfurfural in the original solution (raw solution) can then be calculated by multiplication of the observed concentration by the appropriate factor.

The application of this analytical method to the solutions of invert sugar produced by the methods of this invention shows that even the colorless sterile solutions contain measurable concentrations of 5-hydroxymethylfurfural but that the concentration of this substance did not exceed 0.2% of the hexoses present when color was absent and greatly exceeded this amount in the colored solutions. These facts are revealed in the following table:

ferences between the values before and after sterilization in the last six columns correspond, except at pH 4.6,

TABLE I

*Polarographic determination of the concentration of 5-hydroxymethylfurfural in certain solutions*

| Sample No. | Raw Solution | Cut in the conc. of the raw solution | pH of Solution Analyzed | Galv. Sens. | Polarogram No. | E½ in Volts | id. in μ amps. | Conc. of 6-hydroxymethylfurfural in moles per liter of the Raw Solution | Percent Hexose converted to 5-hydroxymethylfurfural |
|---|---|---|---|---|---|---|---|---|---|
| 1 | 0.5 M Dextrose | 1 | 6.9 | 10 | 1 | −1.54 | | none | |
| 2 | 0.5 M Levulose | 1 | 6.9 | 10 | 2 | | | none | |
| 3 | 0.5 M Sucrose | 1 | 6.9 | 10 | 3 | | | none | |
| 4 | 0.5 M in Dextrose and 0.5 M in Levulose. | 1 | 6.8 | 10 | 4 | | | none | |
| 5 | "Overland" Pure Honey | ⅓₃ | 6.8 | 2 | 5 | | | none | |
| 6 | Saturated Invert Sugar solution at pH 2.8 made by process in accordance with Example 3, infra. | ⅓₃ | 6.9 | 2 | 6 | −1.23 | 0.348 | 1.21×10⁻³ | 0.021. |
| 7 | Same | ⅓₃ | 7.0 | 1 | 7 | −1.22 | .29 | 1.05×10⁻³ | 0.018. |
| 8 | Same | ⅓×⅓₃ | 7.0 | 1 | 7 | −1.24 | .052 | 0.929×10⁻³ | 0.016. |
| 9 | 10% Invert Sugar Solution in accordance with Example 2, sterilized at pH 3.1. | ½ | 6.7 | 10 | 8 | −1.24 | 2.8 | 0.874×10⁻³ | 0.15. |
| 10 | Same | ½ | 6.8 | 10 | 9 | −1.23 | 3.0 | 0.93×10⁻³ | 0.16. |
| 11 | Same | ⅒ | 6.8 | 10 | 9 | −1.24 | .57 | 0.874×10⁻³ | 0.15. |
| 12 | Same but sterilized at pH 3.7 | ½ | 6.7 | 5 | 10 | −1.22 | .99 | 0.306×10⁻³ | 0.053. |
| 13 | Same but sterilized at pH 4.2 | ½ | 6.7 | 10 | 11 | −1.23 | .8 | 0.248×10⁻³ | 0.043. |
| 14 | Same but sterilized at pH 4.6 | ½ | 6.7 | 5 | 12 | −1.20 | .47 | 0.145×10⁻³ | 0.025. |
| 15 | Same except sterilized at pH 6.1 and brown. | ½ | 7.0 | 5 | 13 | | | | greater than 1%. |
| 16 | 5% Dextrose sterilized at pH 3.8 by Abbott Laboratories Inc. | ½ | 6.7 | 5 | 14 | −1.23 | .14 | 0.0436×10⁻³ | 0.015. |

The sucrose employed in the measurements was Revere extra fine granulated cane sugar, purchased in a sealed paper bag from a local grocer.

The dextrose was purchased in a sealed paper carton and was Squibb's U. S. P. XII anhydrous material, equal or superior to what is commonly known as C. P.

The levulose was C. P. special crystals of D-fructose and was part of Phanstiehl's lot No. 1378

$$(\alpha_D^{20} = -92.0°)$$

The "Overland" Pure Honey was purchased in a sealed glass jar from a local grocer.

A more comprehensive understanding of this invention is obtained by reference to the following examples:

EXAMPLE 1

Twelve ±0.02 ml. of 12 N hydrochloric acid (C. P. reagent acid, sp. gr. about 1.19) are thoroughly mixed with 500 ml. water. Ninety-five grams of sucrose are dissolved in the acid solution and inverted by keeping the solution at 50±1° C. for 60±3 minutes. The solution is neutralized by mixing in slowly and thoroughly a volume of 0.3 M sodium bicarbonate until the pH is within the range 2.5 to 4.9. The inversion and neutralization are carried out in a suitable bottle which is adequately vented and in which the solution can be sterilized by moist heat at 250° F. for 20 to 30 minutes. After sterilization, the bottle is hermetically sealed as soon as the autoclave is opened. The autoclave is opened as soon as it has cooled to 180° F.

Data showing that the invert sugar in the aqueous saline solutions prepared by the above example, which is an isotonic solution, is not affected measurably during sterilization for 20 to 30 minutes at 250° F. when the pH of the solution introduced into the autoclave is within the range of 2.5 to 4.9 are given in the following table. The solutions remained water white. The data are for aqueous solutions containing 10 percent invert sugar and 0.85 percent sodium chloride. More than 98 percent of the sucrose had been inverted. The differences between the values before and after sterilization in the last six columns correspond, except at pH 4.6, to the 3 to 4 percent loss of water during sterilization.

| pH | | SHS | | KA | | Optical Activity | |
|---|---|---|---|---|---|---|---|
| before | after | before | after | before | after | before | after |
| 2.9 | 3.0 | 21.8 | 22.5 | 25.9 | 26.4 | −1.65° | −1.71° |
| 3.4 | 3.5 | 21.7 | 22.4 | 25.7 | 26.4 | −1.65° | −1.71° |
| 4.2 | 4.3 | 22.0 | 22.6 | 25.6 | 26.5 | −1.66° | −1.68° |
| 4.6 | 4.8 | 21.7 | 22.3 | 25.8 | 25.9 | −1.62° | −1.61° |

The caption "SHS" in the above table indicates that the values were obtained by the Shaffer, Hartman and Somogyi method [Journal of Biological Chemistry 45:377 (1920–21) 100::695 (1933)] of estimating reducing sugars, and was carried out on 5 ml. aliquots of solutions produced by diluting the original sugar solutions by a factor of 400. One unit of the entries in the table under the designation "SHS" is equivalent to $5.2 \times 10^{-5}$ grams of invert sugar. Accordingly, about 98% of the sucrose was indicated as inverted. Under the designation "KA" in the table are given the values of the estimated aldose content which were determined in accordance with the method of G. M. Kline and S. F. Acree [U. S. Bureau of Standards Journal of Research 5:1063 (1930)]. These values were obtained on 5 ml. samples of the original solutions. One unit of the entries in the table under "KA" is equivalent to $5 \times 10^{-5}$ mole of glucose. Accordingly, 53 instead of 50% of invert sugar might be considered glucose, but the 3% difference may be attributed to the uncertainty of the method as used in the presence of levulose. The optical activities given in the table were the observed values for the D lines of sodium passing through one decimeter of solution at 27±1° C. The sucrose inverted on this basis is 100% within the limits of error of ±0.01° in the polarimeter readings and ±1° C. The uncertainty in the temperature introduces the larger error because of the large change with temperature in the optical activity of the levulose in water solution.

The solutions become discolored during sterilization when the pH at the beginning of sterilization is outside the range of 2.5 to 4.9, and the farther outside this pH range the more intense is the color. The table shows that even in the solution at pH 4.6, which remained water white during sterilization, a measurable loss in optical activity occurred.

The stability of invert sugar in water solution is increased by the removal of the oxygen by the carbon dioxide produced during the neutralization with bicarbonate. The use of bicarbonate also insures that invert sugar is not lost during the neutralization by the momentary local production of pH values of 9 or over as might occur when strong alkaline solutions are used for the neutralization.

The inversion of the sucrose in 0.28 N HCl can be made over 98 percent complete by heating at 60° C. for 15 minutes, or at 57° C. for 20 minutes or at some other temperature for the proper time.

The sucrose solutions were brought quickly to the temperature at which most of the inversion was to take place by swirling them for a few minutes in boiling water. This preheating and its dangers may be eliminated, however, if the solution is allowed to remain some additional time in the constant temperature bath.

EXAMPLE 2

Ten percent colorless sterile invert sugar solutions were prepared with 0.01 mole of sodium chloride per liter of solution. The pH range covered was 2.5 to 4.9. The concentration of sodium chloride (0.01 M) in the final sterile sugar solutions was well below the value of 0.04 M which in saline content is equivalent to the addition of pure water to blood.

The procedure consisted of inverting the sucrose in 0.024 N hydrochloric acid at 80° C. for 25 minutes, then neutralizing the solution with 0.03 molar sodium bicarbonate until the desired pH was obtained. The solutions were then sterilized in an autoclave at 15 lbs. steam pressure (250° F.) for 20 to 30 minutes.

The buffer capacity of the sterile water white solutions at pH 4.0 and greater which were prepared in accordance with Example 2 is less than that of the sterile dextrose solutions commercially available. It takes only one-third as much alkali to bring to pH 7.4, the solutions of this invention having a pH of 4.7 as is required to bring to pH 7.4, the pH of the commercially available 10% dextrose solutions having a pH of 4.7. Accordingly, colorless sterile invert sugar solutions in isotonic sodium chloride as described in Example 1 and in the equivalent of distilled water which contain no buffer are less acid at pH 4.7 than the commercial dextrose solutions (pH 3.8 to 4.0) sold for intravenous use.

EXAMPLE 3

100 ml. of water is saturated with 500 g. of sucrose at room temperature. The mixture is stirred vigorously while 10 ml. of 1.2 N hydrochloric acid are slowly added to it. This is followed by the addition of enough (about 75 ml.) 0.15 M aqueous solution of sodium bicarbonate to bring the pH between 2.5 and 3.0 (a pH of 2.8±0.1 is best). The mixture is placed in a vented flask in an autoclave and heated at 15 lbs. steam pressure between twenty and thirty minutes. The final product of this example is saturated aqueous solution of invert sugar.

This procedure inverts between 99 and 99.9% of the sucrose and sterilizes the solution without producing color (browning) or sufficient 5-hydroxymethylfurfural to give a positive chemical test for it.

The saturated aqueous solution of invert sugar resulting from the practice of the procedure of this example contains less than 1% by weight of sucrose and does not give a positive chemical test for 5-hydroxymethylfurfural by the analytical research methods recommended for its detection, and shows less than 0.02% 5-hydroxymethylfurfural by weight of the total sugar as measured with the aid of polarograph. The solution is also sterile and may be used if desired as an "artificial honey." The pH of native honey is 3.7±0.1. The pH of the above solution of invert sugar ("artificial honey") may be brought to this pH by the addition of sodium bicarbonate. If the "artificial honey" is used to cut native honey, it is best to bring the pH of the native honey high enough (above 3.7) by the addition of sodium bicarbonate so that the pH of the cut honey is at 3.7±0.1 after mixing in the "artificial honey."

The "pH" values cited above were obtained by means of a pH meter employing a glass electrode and a calomel half cell. The bulb of the glass electrode was immersed in the sugar solution and the calomel half cell was connected to the solution by a bridge of a saturated aqueous solution of potassium chloride. The scale of the pH meter was calibrated by means of buffer tablets in each case dissolved in the specified volume of water.

EXAMPLE 4

This example is directed to the preparation of a liter of solution of sterile water white invert sugar having a final concentration of about 10 percent invert sugar, 0.07 percent sodium chloride. The final pH is between 4.0 and 4.8 and the buffer capacity is below that of commercial sterile dextrose solutions for intravenous injection.

The procedure used to produce the sterile water white solutions of invert sugar was as follows:

To a one liter sterilization bottle, 500 ml. water and 10 ml. of 1.2 HCl were added and mixed thoroughly. To this solution of hydrochloric acid, 95±2 g. sucrose was added and the contents of the bottle were thoroughly mixed until the sucrose had dissolved completely.

The bottle was capped with a rubber bushing into which was inserted a stainless steel cap which could serve as a vent or a seal. It was essential to vent the bottle until the contents were sterilized, in order that gases could escape from the bottle. The bottle and contents were brought to 80±1° C. and held at this temperature for 25±2 minutes. The bottle and contents could be brought to 80° C. within 5 minutes by swirling the bottle in a rapidly boiling water bath. Then, the bottle was transferred at once to a bath at 80±1° C. for the required time. If the bottle was transferred from room temperature to the bath at 80° C., it took about 15 minutes for the bottle and contents to reach 80° C. Moreover, the bath temperature might drop several degrees when it received the cold bottle, and when this occurred, more than 15 minutes were required to bring the material to 80° C.

The bottle was removed from the 80° C. bath to room temperature. Within two minutes, the cap and rubber bushing were removed from the hot bottle, the bottle was swirled, and while the contents were rotating rapidly, the proper amount (380 to 400 ml.) of 0.03 M bicarbonate was cautiously added to bring the pH to 4.4±0.3.

The proper amount of 0.003 M bicarbonate was determined in the first experiments by adding initially about 375 ml. of the bicarbonate, mixing, and then determining the pH. If the pH was less than 4.3, the bicarbonate solution was added in lots of 10 ml.; after each addition the bicarbonate solution added was mixed into the solution while the cap was removed from the bottle. The pH was then determined. This procedure was repeated until the pH reached 4.4±0.1. Thereafter, the proper amount of 0.03 M bicarbonate to give a pH of 4.4±0.3 could be added in one operation.

After the rubber bushing and cap were replaced on the sterilization bottle and the bottle was adequately vented, the bottle and contents were placed in an autoclave and sterilized at 15 lbs. steam pressure (250° F.) for 20 to 30 minutes. It should take no more than 8±3 minutes to bring the steam pressure in the autoclave up to 15 lbs. After sterilization, the steam was shut off and when the pressure had dropped to less than 2 lbs., the door of the autoclave was opened and the bottle caps were pushed down to seal the vents.

The solutions are colored (browned or caramelized)

if the final pH is below 2.3 or above 5.1 when sterilized by heat, or if heated much longer than the time required for sterilization or if more than 99.9 percent of the sucrose has been inverted or if at any time strong acid, for example, 6 N hydrochloric acid, or strong alkali, for example, 6 N sodium hydroxide, has contacted the sugar solution for several minutes especially at temperatures above 30° C. The solutions are pyrogen free only if pyrogen free materials are used with appropriate care. C. W. Walters, Surgery, Gynecology and Obstetrics 63, 643 (1936) gives a method and the equipment necessary to prepare pyrogen free solutions for parenteral use.

The materials and equipment used in the preparation of the sterile water white solutions described in this example are as follows:

White granulated sucrose was purchased from a grocery, the paper bag container was sealed at the refinery and the seal had not been broken.

The hydrochloric acid was C. P. reagent acid, sp. gr. about 1.19. The solution was diluted ten fold to make it 1.2 N HCl, e. g., 10 ml. of the acid was diluted to 100 ml. of solution.

The sodium bicarbonate was analytical reagent quality.

The water was freshly distilled from a clean still and condensing system.

The sugar solutions were made up, inverted, and sterilized in commercial sterilization bottles of one liter capacity. Selected Fenwal bottles, rubber bushings, and stainless steel stoppers which provided venting were satisfactory. The equipment was carefully selected to insure proper venting and an airtight seal when closed.

A platform balance sufficed for weighting the sucrose and sodium bicarbonate.

A one day supply of 1.2 N HCl and 0.03 M bicarbonate (25g. NaHCO₃ per liter) solutions was made up at the beginning of each day. The preparation of each liter of sterile invert sugar solution required 10 ml. of 1.2 N HCl and about 400 ml. of 0.03 M bicarbonate. The concentrations were within ±5 percent of the above values, but it was important that they were uniform throughout. The 10 ml. of the 1.2 N HCl used to make up the acid sucrose solution should be reproduced within ±0.01 ml. These precautions are necessary if one desires to have the amount of the 0.03 M bicarbonate solutions required to bring the pH between 4.0 and 4.8 remain constant within ±5 ml. once the proper amount required to bring the pH to 4.4 has been determined for the stock solutions used that day.

A 10 ml. transfer pipette was satisfactory for measuring and transferring with care the 1.2 N HCl. A 500 ml. graduate sufficed for measuring and transferring the 0.03 M bicarbonate solution. The water could be measured closely enough by noting the volume indicated by the rough scale on the sterilization bottle.

The pH values were measured to ±0.1 unit by means of pH paper and checks were made with a pH meter. The small samples of the solutions required for the pH measurement were discarded. In most cases, the pH of each solution was determined within ±0.1 prior to the sterilization, and the pH values were found to be 4.4±0.3. The pH increased about 0.1 during the sterilization by heat.

A steam bath or pail partly filled with rapidly boiling water was used to bring the sucrose solution rapidly to 80±2° C. The temperature of the solution was followed, while it was being brought to 80° C. This was done by inserting a suitable thermometer into the solution via the hole in the rubber bushing which capped the sterilization bottle.

A circulating water bath at 80±1° C. sufficed for inverting the sucrose. The sucrose solutions were not stirred when they were in the bath if they had been preheated to 80° C.

The sugar solutions were mixed adequately by grasping the neck of the container and swirling until the contents rotated rapidly, then the motion was suddenly reversed and the operation repeated three or four times. It was necessary to invert the container several times in order to mix in the material adhering to the inside of the neck of the bottle. The container was capped and sealed with stainless steel stoppers during these operations unless otherwise noted.

EXAMPLE 5

An approximately 30% solution of invert sugar is prepared in the following manner:

2000 liters of distilled water, equivalent to approximately three-fourths of the final volume of solution desired, is placed in a glass lined tank. The pH of the water is adjusted with 800 ml. of concentrated reagent grade hydrochloric acid to obtain a pH of about 2.35, and about 60 grams of sodium bicarbonate are added to remove an amount of oxygen sufficient to prevent the development of color. The pH of the resulting solution is about 2.4. The solution is brought to a boil and 1600 pounds of sucrose are immediately added with constant agitation. The temperature of the solution is maintained at the boiling point for a predetermined period of time necessary for the substantially complete inversion of sucrose to invert sugar. The time required for this inversion is 30 to 40 minutes.

The pH of the approximately 30% invert sugar solution is adjusted to about 4.3 by the addition of sodium bicarbonate in the form of a 0.03 M solution. The percentage of invert sugar in the solution is then determined. The solution is diluted to a concentration of 10% invert sugar. The solution is filtered and filled into bottles. A stopper-air tube assembly is placed on each bottle, a partial vacuum created and the remainder of the closure is applied. The pH of the diluted solution before sterilization is 4.6 and after sterilization, it is about 4.2.

The sealed bottles are sterilized in a pressure autoclave for a period of 35 minutes at 7 pounds' pressure of steam. The sterilized solutions are allowed to cool.

The colorless solutions prepared in accordance with Examples 1, 2, 3, 4 and 5 were found to be substantially free of 5-hydroxymethylfurfural when tested in accordance with the method described in Physical and Chemical Methods of Sugar Analysis by Browne and Zerban, p. 714, published by John Wiley and Sons, Inc. of N. Y., 1941. Analyses by means of the polarograph showed that they contained less 5-hydroxymethylfurfural than 0.1% by weight of the hexoses present in the solutions.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. The process of producing a sterile water white solution of invert sugar which contains an amount by weight of 5-hydroxymethylfurfural less than 0.2% of the hexose present, said process comprising hydrolyzing 98 to 99.9% of sucrose in an aqueous solution having a pH of 0.0 to 4.0 in the substantial absence of an oxidizing agent and at a temperature within the range of 0° to 125° C., and sterilizing by heat said solution under such conditions that the sterilized solution has a pH within the range of 2.5 to 4.9, the concentration of said sucrose prior to hydrolysis being not more than 30% when the hydrolysis is effected at a pH above 3.0 and being not more than 10% when the hydrolysis is effected at a pH above 3.5.

2. The process of producing a sterile water white solution of invert sugar in accordance with claim 1, in which the hydrolysis is effected by hydrochloric acid.

3. The process of producing a sterile water white solution of invert sugar which contains an amount by weight of 5-hydroxymethylfurfural less than 0.2% of the hexose present, said process comprising hydrolyzing 98 to 99.9% of sucrose in an aqueous solution having a pH of 0.0 to 3.0 in the substantial absence of an oxidizing agent and at a temperature within the range of 0° to 125° C., and sterilizing by heat said solution under such conditions that the sterilized solution has a pH within the range of 2.5 to 4.9.

4. The process of producing a sterile water white solution of invert sugar which contains an amount by weight of 5-hydroxymethylfurfural less than 0.2% of the hexose present, said process comprising hydrolyzing 98 to 99.9% of sucrose in an aqueous solution having a pH of 0.0 to 3.5 in the substantial absence of an oxidizing agent and at a temperature within the range of 0° to 125° C., and sterilizing by heat said solution under such conditions that the sterilized solution has a pH within the range of 2.5 to 4.9, said aqueous solution prior to hydrolysis containing not more than 30% of sucrose by weight.

5. The process of producing a sterile water white solution of invert sugar which contains an amount by weight of 5-hydroxymethylfurfural less than 0.2% of the hexose present, said process comprising hydrolyzing 98 to 99.9% of sucrose in an aqueous solution with a non-oxidizing acid at a pH within the range of 0.0 to 3.0 and at a temperature within the range of 0° to 125° C., said aqueous solution being initially treated when the hydrolysis is effected at a pH above 2.3 by adding a nontoxic salt of carbonic acid until the pH of the solution is between 2.3 and 3.0, and sterilizing by heat the resulting solution under such conditions that the sterilized solution has a pH within the range of 2.5 to 4.9.

6. The process of producing a sterile water white solution of invert sugar which contains an amount by weight of 5-hydroxymethylfurfural less than 0.2% of the hexose present, said process comprising adding sucrose to water having a pH within the range of 0.0 to 3.0, and when the pH is above 2.3, having the major portion of oxygen removed therefrom, hydrolyzing 98 to 99.9% of said sucrose in the substantial absence of an oxidizing agent and at a temperature within the range of 0° to 125° C., adjusting the pH of the hydrolyzed solution to a value such that said hydrolyzed solution after sterilization has a pH within the range of 2.5 to 4.9, and sterilizing by heat the resulting hydrolyzed solution.

7. The process of producing a water white solution of invert sugar in accordance with claim 6, in which the nonoxidizing acid is hydrochloric acid.

8. The process of producing a sterile water white solution of invert sugar which contains an amount by weight of 5-hydroxymethylfurfural less than 0.2% of the hexose present, said process comprising adjusting the pH of water to within the range of 2.3 to 3.0 with hydrochloric acid, adding sufficient sodium bicarbonate to remove a major portion of the oxygen from said water and maintaining the pH at not greater than 3.0, adding sucrose to the resulting solution, hydrolyzing 98 to 99.9% of said sucrose at a temperature within the range of 0° to 125° C., adjusting the pH of the hydrolyzed solution to a value such that said hydrolyzed solution after sterilization has a pH within the range of 2.5 to 4.9, and sterilizing by heat the resulting adjusted hydrolyzed solution.

9. The process of producing a sterile water white solution of invert sugar which contains an amount by weight of 5-hydroxymethylfurfural less than 0.2% of the hexose present, said process comprising adjusting the pH of water to about 2.3 with hydrochloric acid, adding sufficient sodium bicarbonate to increase the pH to about 2.4, bringing the resulting adjusted solution to a boil at atmospheric pressure, adding sufficient sucrose to produce an aqueous solution of about 30% sucrose, boiling the resulting solution for a period of 30 to 40 minutes to hydrolyze 98 to 99.9% of the sucrose, adjusting the pH of the solution of invert sugar to about 4.3 with sodium bicarbonate, diluting the adjusted solution with water to a content of about 10% of invert sugar, filling the diluted solution into containers and sterilizing by heat the diluted solution in said containers.

References Cited in the file of this patent

UNITED STATES PATENTS

| | | |
|---|---|---|
| 1,949,657 | Preston | Mar. 6, 1934 |
| 2,328,191 | Cantor | Aug. 31, 1943 |
| 2,461,163 | La Lande | Feb. 8, 1949 |
| 2,534,694 | Blann | Dec. 19, 1950 |
| 2,594,440 | Hughes | Apr. 29, 1952 |

OTHER REFERENCES

Bruhns: Int. Sugar Jour., February 1946, pages 51 and 52.

Sugar Analysis, Browne and Zerban, 3d edition, New York, 1945, pages 405 to 415.

Cane Sugar Handbook, Spencer-Meade, 8th edition, New York, 1945, pages 676 and 677.

Hawaiian Planter's Record, 2nd quarter, 1943, volume 47, Number 2, pages 97 to 102 and 104 to 107.

Archiv for Pharmaci og, June 11, 1946, pages 371–374.